United States Patent
Lamm et al.

(10) Patent No.: US 10,271,028 B1
(45) Date of Patent: Apr. 23, 2019

(54) DEVICE, SYSTEM AND METHOD FOR SUBLIMINALLY PROJECTING STRUCTURED LIGHT PATTERNS

(71) Applicant: CHRISTIE DIGITAL SYSTEMS USA, INC., Cypress, CA (US)

(72) Inventors: Mark Lamm, Mississagua (CA); Randy Spruyt, Waterloo (CA); Ryan Thomas Morris, Kitchener (CA); Colin Yardley, Waterloo (CA); John Vieth, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/969,049

(22) Filed: May 2, 2018

(51) Int. Cl.
*G06T 7/70* (2017.01)
*H04N 9/31* (2006.01)
*H04N 5/232* (2006.01)

(52) U.S. Cl.
CPC ............ *H04N 9/3191* (2013.01); *G06T 7/70* (2017.01); *H04N 5/232* (2013.01); *H04N 9/3147* (2013.01)

(58) Field of Classification Search
CPC ...... H04N 9/3191; H04N 9/3147; G06T 7/70; H05N 5/232
See application file for complete search history.

(56) References Cited

U.S. PATENT DOCUMENTS

| 9,049,369 B2 | 6/2015 | Vieth et al. | |
| 9,696,145 B2* | 7/2017 | Sze | G01B 11/25 |
| 2002/0158819 A1* | 10/2002 | Lee | G09G 3/2059 345/60 |
| 2016/0366397 A1 | 12/2016 | Lee et al. | |
| 2017/0131089 A1 | 5/2017 | Bronstein et al. | |
| 2017/0277028 A1 | 9/2017 | Short et al. | |

* cited by examiner

*Primary Examiner* — Michael E Teitelbaum
(74) *Attorney, Agent, or Firm* — Perry + Currier, Inc.

(57) ABSTRACT

A device, system and method for subliminally projecting structured light patterns is provided. A computing device alters at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration. A a projector projects the structured light bitplane and the plurality of content bitplanes having the structured light bitplane subtracted therefrom. A camera captures images of the structured light bitplane as projected by the projector, for example to calibrate the projector.

20 Claims, 10 Drawing Sheets

DEVICE, SYSTEM AND METHOD FOR SUBLIMINALLY PROJECTING STRUCTURED LIGHT PATTERNS

FIELD

The specification relates generally to projection calibration, and specifically to a device, system and method for subliminally projecting structured light patterns.

BACKGROUND

Projection mapping is often a very complicated process due to the careful alignment of projectors required to align numerous two-dimensional ("2D") projected images onto a three-dimensional ("3D") surface. Hence, the pose of each of the projectors relative to the surface needs to be calibrated, which is often performed using cameras acquiring images of the physical object as a projector is projecting calibration patterns (e.g. structured light patterns) onto the surface. For example, the structured light patterns generally comprise a series of binary patterns that enable the position of projector pixels to be found on the surface. In particular, images of the structured light patterns on the surface, captured by a camera, may be compared with the actual structured light patterns to determine a geometry of the projectors with respect to the surface and/or the geometry of the surface. However, the structured light patterns are usually projected "off-line", for example in advance of a show of images projected onto the surface. Hence, this can waste time prior to the show. Furthermore, if the projector and surface move relative to each other after calibration, for example during the show, the projected images may be ruined as they may no longer be aligned with the surface; hence, structured light patterns may again have to be projected off-line to again perform a calibration, thereby interrupting the show.

BRIEF DESCRIPTIONS OF THE DRAWINGS

For a better understanding of the various embodiments described herein and to show more clearly how they may be carried into effect, reference will now be made, by way of example only, to the accompanying drawings in which.

Figure 6:
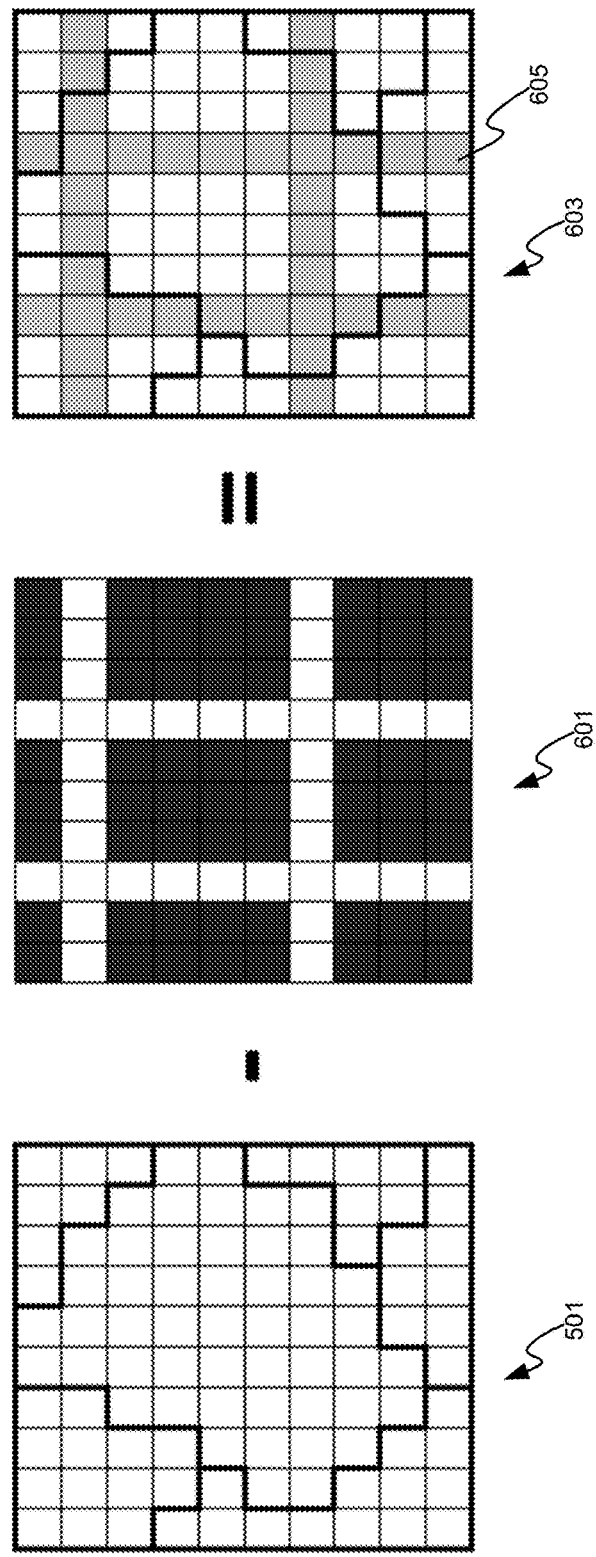
Figure 7:
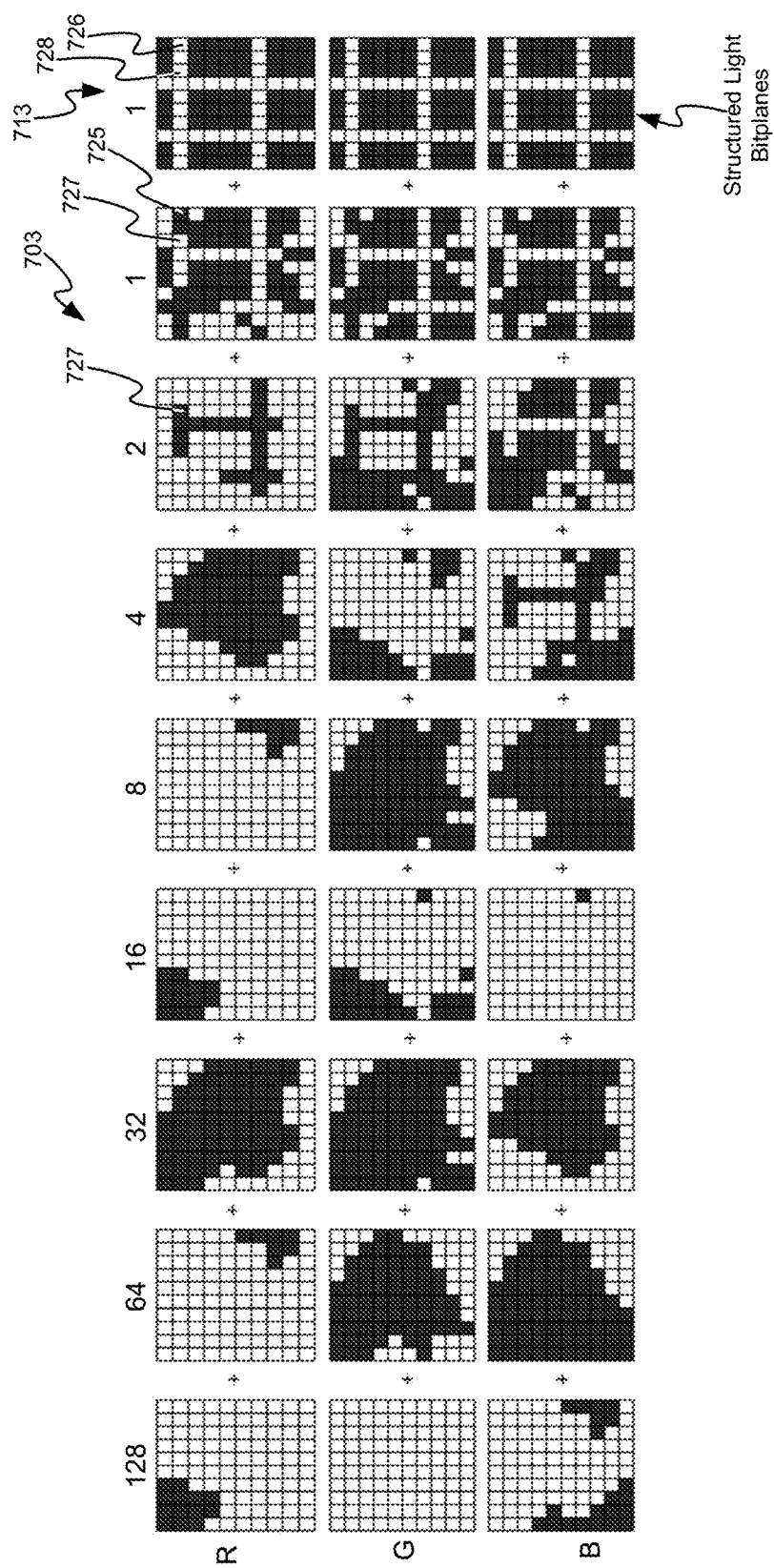

FIG. 6 depicts a subtraction of a structured light pattern from a video frame, according to non-limiting embodiments FIG. 7 depicts altering of at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration, according to non-limiting embodiments.

Figure 2:
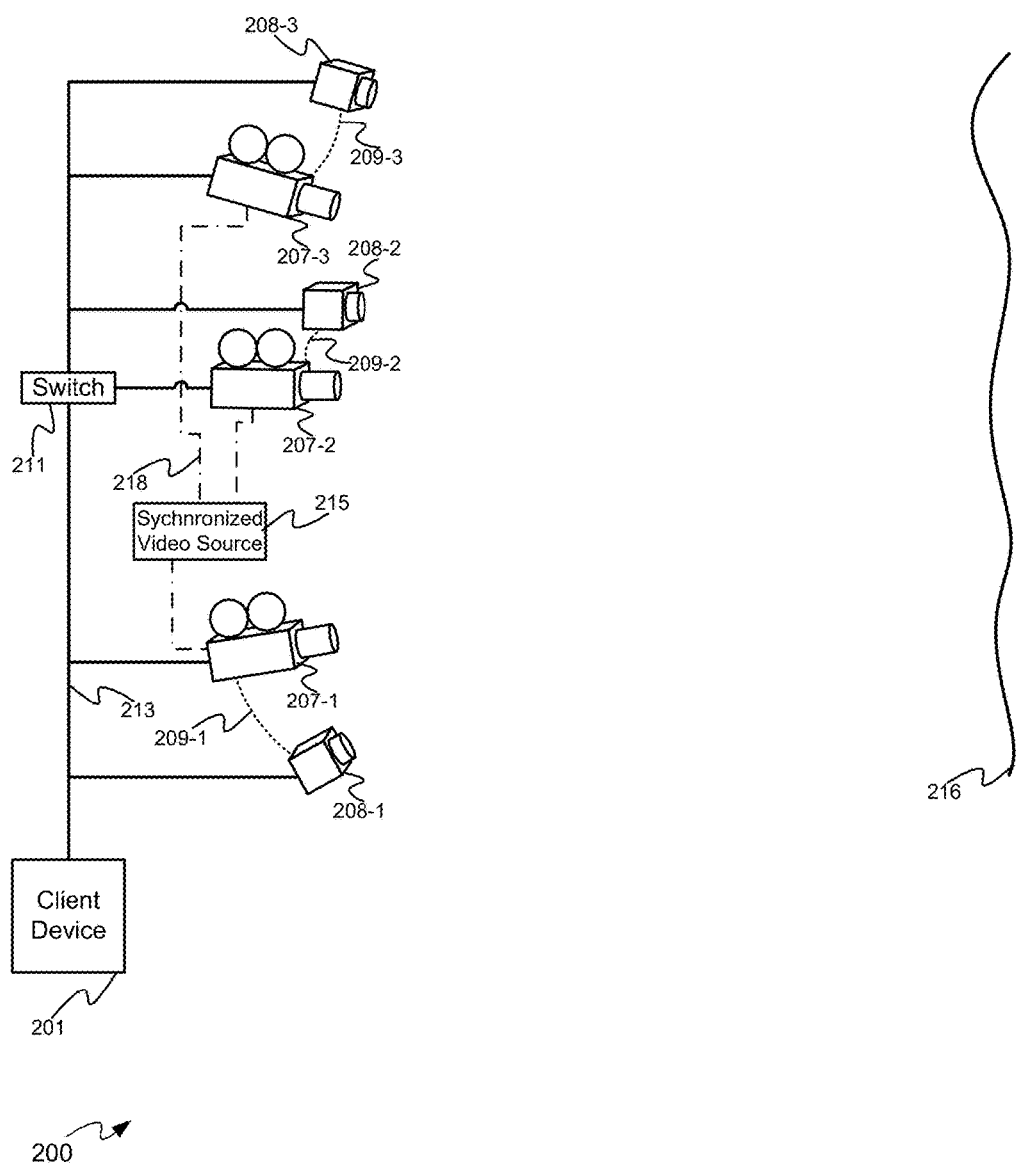
FIG. 2 depicts a system for subliminally projecting structured light patterns, which can be used in the system of FIG. 1, according to non-limiting embodiments.
Figure 8:
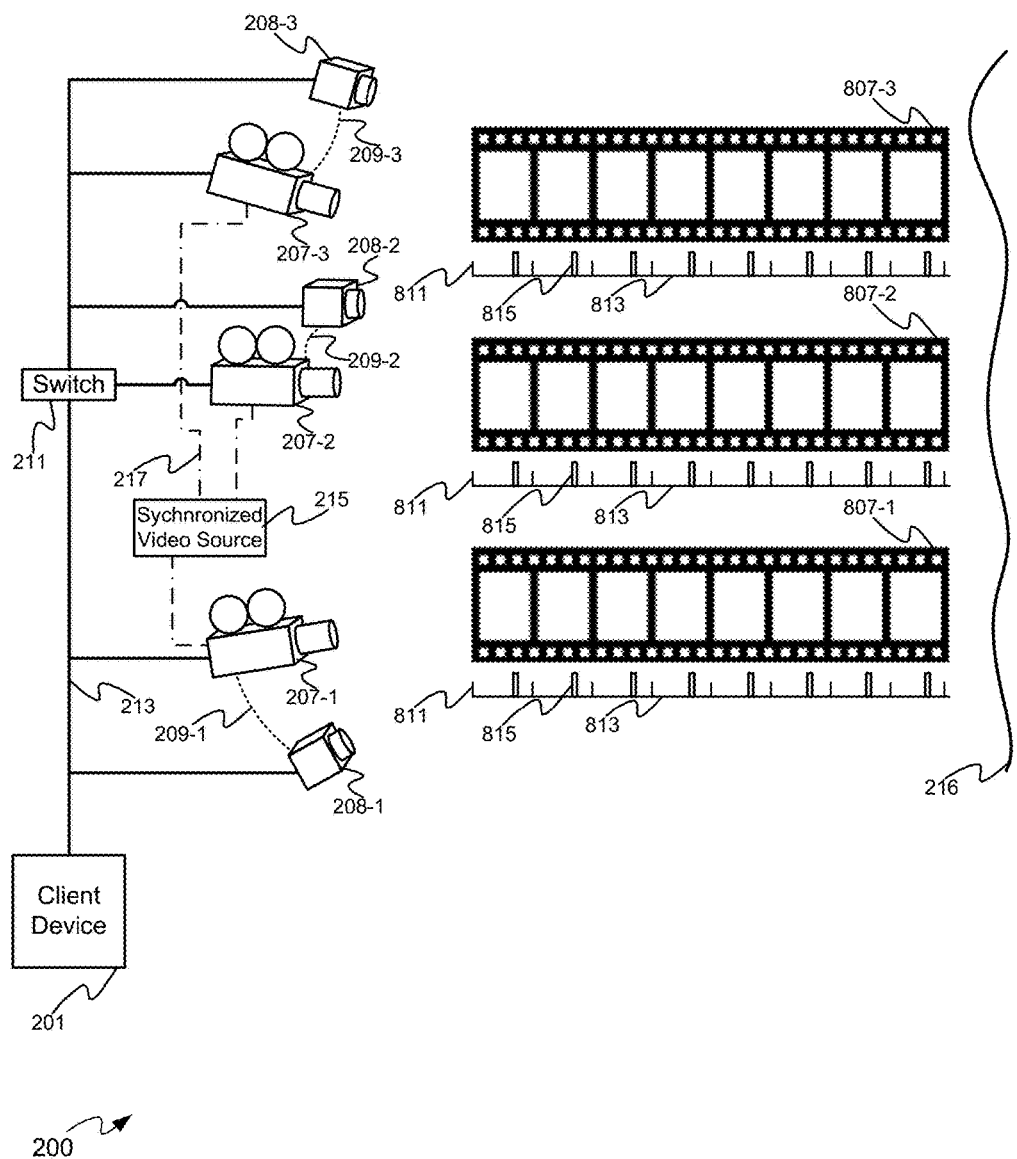

FIG. 8 depicts the system of FIG. 2 prior to subliminally projecting structured light patterns, according to non-limiting embodiments.

Figure 9:
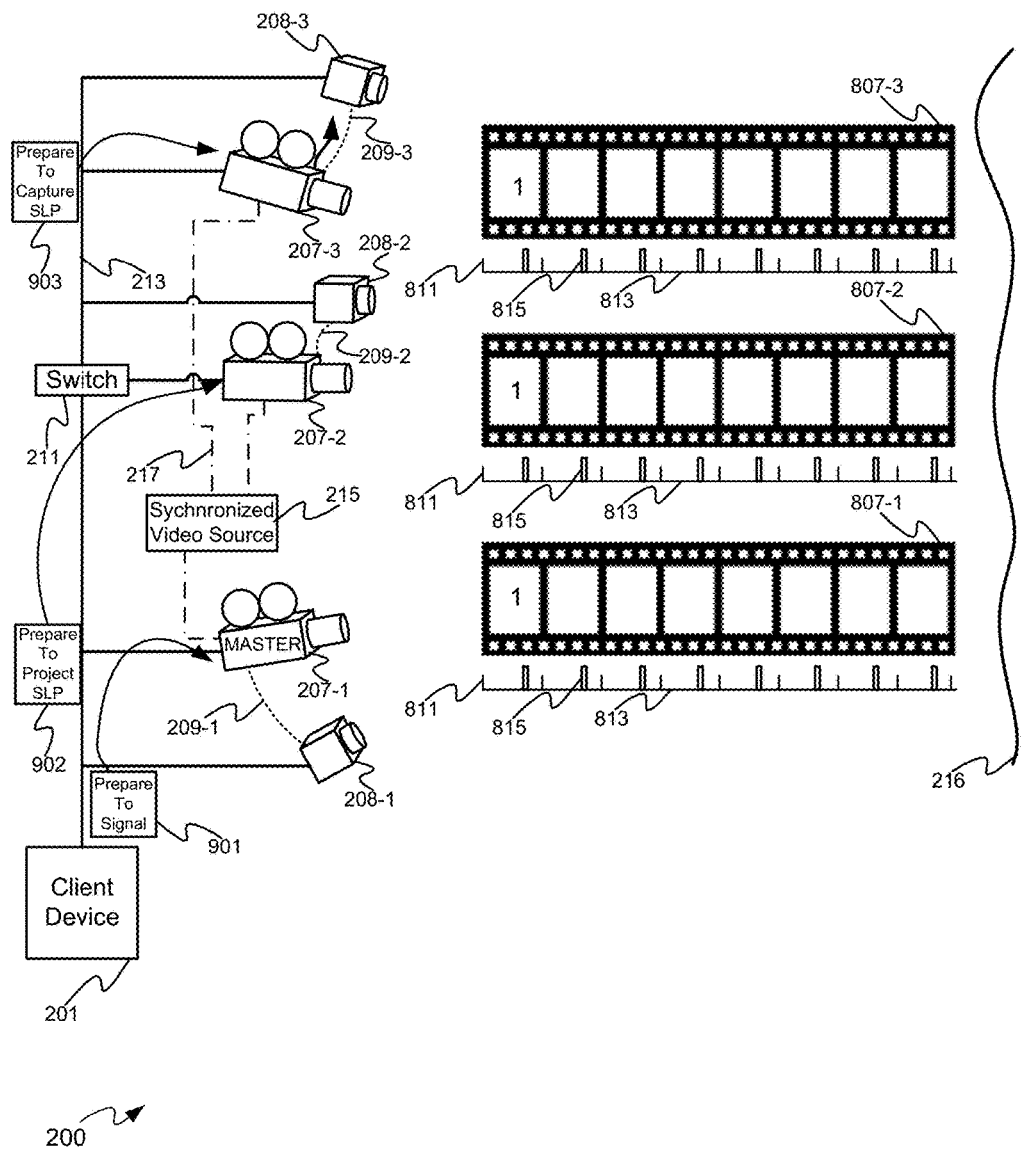

FIG. 9 depicts the system of FIG. 2 preparing to subliminally project structured light patterns, according to non-limiting embodiments.

Figure 10:
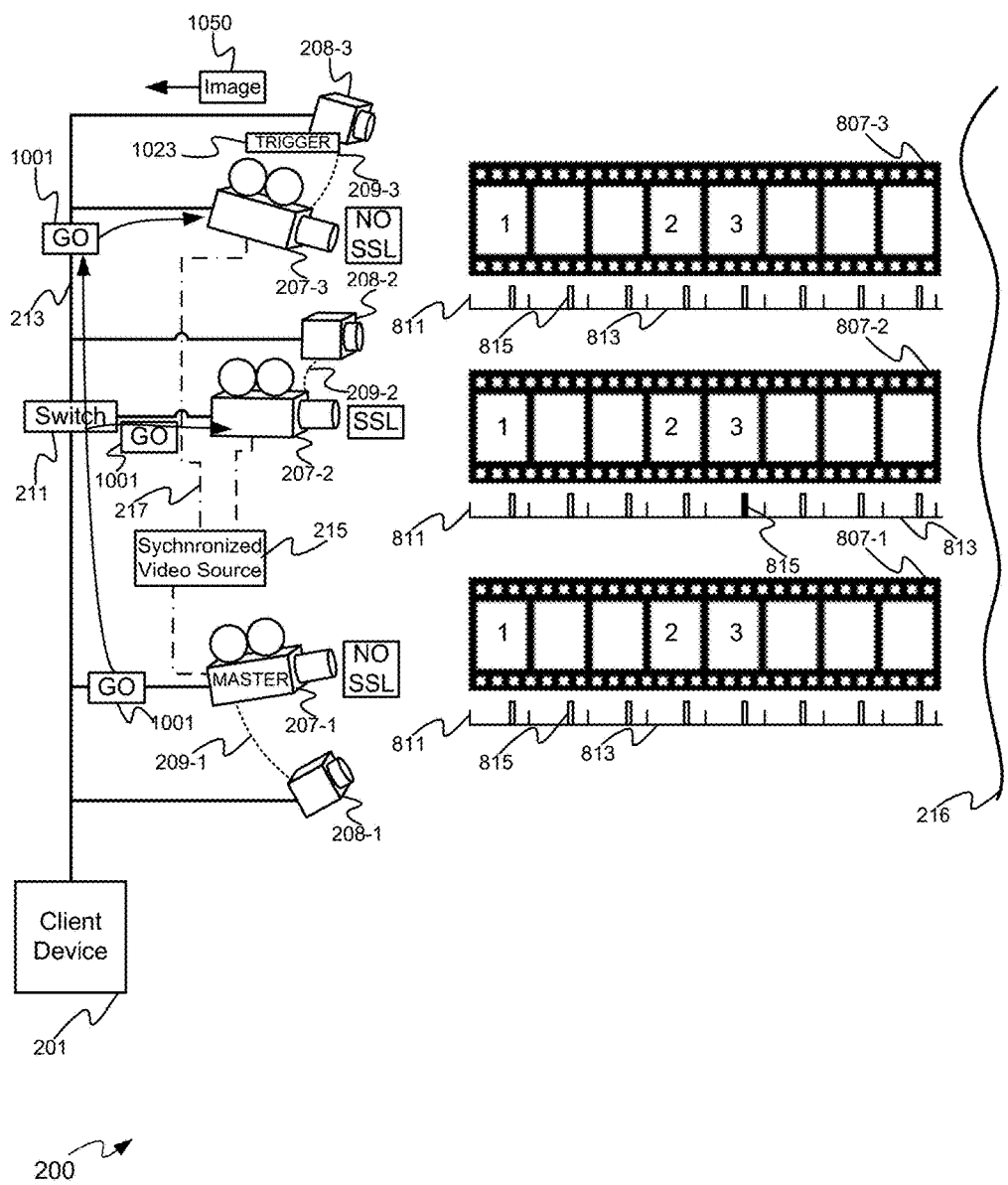

FIG. 10 depicts the system of FIG. 2 subliminally projecting structured light patterns, according to non-limiting embodiments.

DETAILED DESCRIPTION

An aspect of the specification provides a system comprising: a computing device configured to: alter at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration; a projector configured to project the structured light bitplane and the plurality of content bitplanes having the structured light bitplane subtracted therefrom; and, a camera configured to capture images of the structured light bitplane as projected by the projector.

Another aspect of the specification provides a method comprising: altering, at a computing device, at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration; projecting, using a projector, the structured light bitplane and the plurality of content bitplanes having the structured light bitplane subtracted therefrom; and, capturing, using a camera, images of the structured light bitplane as projected by the projector.

Figure 1:
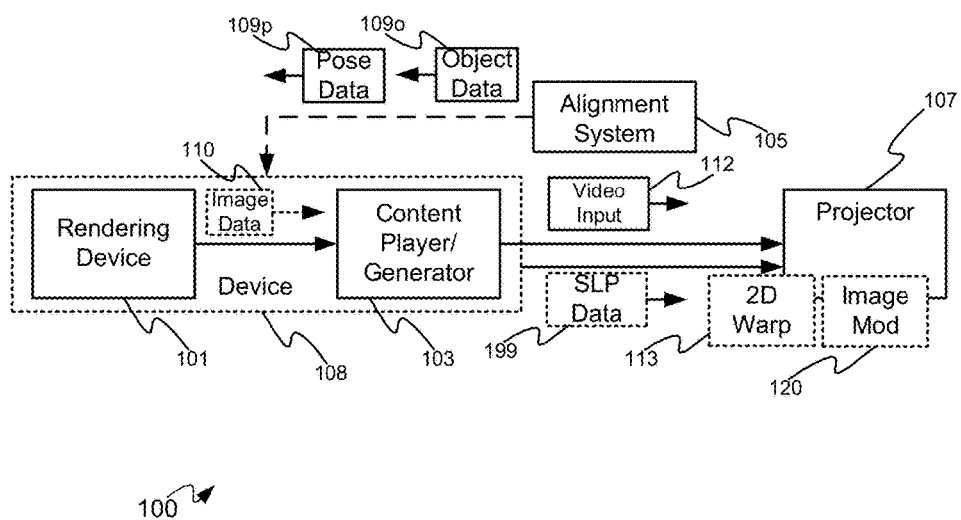
FIG. 1 depicts a projection system, according to non-limiting embodiments.

FIG. 1 depicts a system 100 comprising: a rendering device 101 (interchangeably referred to hereafter as the rendering device 101); a content player 103 (and/or content generator); an alignment system 105; and a projector 107. In general, the rendering device 101 is in communication with content player 103 and optionally alignment system 105, and content player 103 is in communication with projector 107.

As depicted, the rendering device 101 and the content player 103 are combined into one device 108, however in other implementations the rendering device 101 and the content player 103 can be separate devices. The alignment system 105 is configured to generate the pose data 109$p$ comprising at least data defining geometric relationships between, for example, the projector 107 and objects onto which the projector 107 projects. Generally, the pose data 109$p$ comprises a location of the projector 107 (e.g. in "x,y,z" coordinates relative to the object) and an orientation of the projector 107 (e.g. a "yaw", a "pitch" and a "roll" relative to the object). However, the pose data may also comprise intrinsic properties of the projector 107, such as lens characteristics, and the like.

The rendering device 101 can generate rendered image data 110, for example by rendering existing image data (not depicted) for projection by the projector 107. The image data 110 may generally comprise two-dimensional images. The content player 103 combines the image data 110 with pose data 109$p$ (and the object data 109$o$) received by the alignment system 105 to produce video input 112, which comprises the image data 110 altered for a perspective for projection on an object by the projector 107. In FIG. 1, solid lines connecting components show flow of image and/or video data there between, while the stippled line connecting the alignment system 105 to the rendering device 101 and/or device 108 shows flow of the pose data 109p and object data 109o there between. The object data 109o generally comprises a model of a location and orientation of the object onto which images from the projector 107 are projected, and can be provided with the object and/or determined by the alignment system 105 using one or more cameras.

When the rendering device 101 and the content player 103 are separate, the rendering device 101 communicates the image data 110 to the content player 103, which processes and/or "plays" the image data 110 by producing the video input 112 suitable for processing and projection by the projector 107. For example, the image data 110 can include, but is not limited to, an AVI file, a series of JPG files, a PNG file, and the like. The video input 112 can include, but is not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

When the rendering 101 and the content player 103 are combined in device 108, device 108 can render the video input 112 (e.g. video data) in real-time without producing the image data 110. In any event, the video input 112 is communicated to the projector 107 by the content player 103 where the video input 112 is used to control the projector 107 to project images based thereupon, for example onto a three-dimensional object. The video input 112 may comprise images for projection onto the three-dimensional object, for example the images 110 altered for the perspective of the projector 107 relative to the three-dimensional object, as determined using the pose data 109p and/or the object data 109o; however the video input 112 may further comprise the pose data 109p, extrinsic properties of the projector 107, settings for the projector, and the like.

The rendering device 101 generally comprises an image generator and/or renderer, for example a computing device, a server and the like, configured to generate and/or render images as the image data 110. Such the image data 110 can include, but is not limited to, still images, video and the like. Furthermore, though not depicted, the rendering device 101 can be in communication with, and/or comprise, an image generator and/or a memory storing data from which the image data 110 can be generated and/or rendered.

Alternatively, the rendering device 101 can generate the image data 110 using algorithms, and the like, for generating images.

The content player 103 comprises a player configured to "play" and/or render the image data 110 according to the pose data 109o; for example, when the image data 110 comprises video data, the content player 103 is configured to play and/or render the video data by outputting the video input 112 for projection by the projector 107. Hence, the content player 103 can include, but is not limited to a video player, a video processing device, a computing device, a server, and the like. However, as described above, when the rendering device 101 and the content player 103 are combined as device 108, rendering of the image data 110 can be eliminated and device 108 renders the video input 112 without producing the image data 110.

The alignment system 105 comprises any suitable combination of projectors (including the projector 107), cameras (not depicted in FIG. 1), and computing devices configured to one or more of: automatically determine the pose data 109p of the projector 107; and optionally automatically determine the object data 109o. Non-limiting implementations of the alignment system 105 will be described below with reference to FIG. 2 to FIG. 10.

The projector 107 comprises a projector configured to project the video input 112, including but not limited to a digital projector, a cinema projector, an LCOS (Liquid Crystal on Silicon) based projector, a DMD (digital micromirror device) based projector and the like. Furthermore, while only one the projector 107 is depicted, system 100 can comprise a plurality of projectors 107, each configured to project respective projection data comprising, for example, portions of larger tiled image to be projected. Regardless of a technology used in the projector 107, it is assumed that the projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 optionally further comprises one or more 2D ("two-dimensional") warping devices and/or modules 113, for example at the projector 107 (though such a warping device can be present at the content player 103 and/or as a stand-alone device) When present, video input 112 can be warped by the warping module 113, for example by moving and/or adjusting pixels within the video input 112, to adjust the video input 112 for projection by the projector 107 onto an object including, but not limited to, a screen, an object and the like. However, as the alignment system 105 determines the pose data 109p and communicates such to the rendering device 101 (and/or device 108), the warping module 113 can be unused, optional and/or eliminated from system 100. Indeed, use of the warping module 113 represents how images were processed according to the prior art and the presence of the warping module 113 is obviated by virtue of the alignment system 105 providing the rendering device 101 (and/or device 108) with the pose data 109p. However, in some implementations, the warping module 113 can be used to make small changes to projection of images onto a physical object, for example when a virtual model of the object used to produce the images does not precisely match the physical object.

Also depicted in FIG. 1, system 100 optionally further comprises one or more image modification devices and/or modules 120, for example at the projector 107 (though such an image modifications device can be present at content player and/or as a stand-alone device) When present, video input 112 can be modified by the image modification device 120, for example, by altering the video input 112 to include other images, such as structured light patterns, as described in more detail below. In some embodiments warping module 113 and the image modification module 120 may be integrated with each other. The image modification module 120 may be external to, or integrated with, the projector 107. In yet further embodiments, functionality of the image modification module 120 may be integrated with the projector 107. In some embodiments, the image modification module 120 may be controlled by the alignment system 105.

While each of the rendering device 101, the content player 103, the alignment system 105, and the projector 107 are depicted as distinct components, in other implementations, respective portions of one or more of the rendering device 101, the content player 103, the alignment system 105, and the projector 107 and can be implemented within the same device (e.g. device 108) and/or processing resources can be shared there between including, but not limited to, in a cloud computing arrangement. For example, while not depicted, system 100 comprises one or more controllers, one or more processors, one or more memories and one or more communication interfaces, for example a controller, memory and communication interface for each of the rendering device 101, the content player 103, the alignment system 105, and the projector 107 and/or to be shared among the rendering device 101, the content player 103, the alignment system 105, and the projector 107. Indeed, in general, components of system 100, as depicted, represent different functionality of a projection system where: the pose data 109p of the projector 107 can be automatically determined. In some implementations, system 100 includes components and/or functionality for projection mapping onto three-dimensional objects and/or for updating the pose data 109p when the projector 107 moves, and/or a screen and/or object, onto which images are being projected, moves.

As depicted, the device 108 and, the like is furthermore providing structured light pattern data 199 to the projector 107, for example for incorporation into images to be projected by the projector 107, as described below. For example, one or more of the rendering device 101, the content player 103 and the device 108 may store the structured light pattern data 199 and provide to the projector 107. In other embodiments, the projector 107 may be preconfigured with the structured light pattern data 199

Attention is next directed to FIG. 2 which depicts a system 200 for subliminally projecting structured light patterns. Indeed, the alignment system 105 can comprise the system 200, and furthermore components of the system 100 can comprise components of the system 200 as desired.

The system 200 comprises a client device 201 (e.g. a computing device), one or more projectors 207-1, 207-2, 207-3 (interchangeably referred to hereafter, collectively, as projectors 207 and, generically, as a projector 207) and one or more cameras 208-1, 208-2, 208-3 (interchangeably referred to hereafter, collectively, as cameras 208 and, generically, as a camera 208) that are arranged relative to a physical object onto which images are to be projected, for example in a projection mapping "show"; as depicted the physical object comprises a three-dimensional surface 217, however projection mapping may occur on any physical object.

In particular, the field of view of each camera 208 overlaps with at least a portion of a field of view of at least one of the projectors 207 such that each camera 208 may capture images of images projected by the projectors 207. As depicted, it is assumed that camera 208-3 has a field of view that overlaps with the field of view of both the projectors 207-2, 207-3.

While three projectors 207 and three cameras 208 are depicted, the system 200 may comprise as few as one projector 207 and one camera 208. Furthermore, while as depicted, the cameras 208 are provided in a one-to-one relationship with the projectors 207, there may be more or fewer cameras 208 than projectors 207.

As depicted, each of the cameras 208 is in communication with a respective projector 207 via a respective trigger cable 209-1, 209-2, 209-3 (interchangeably referred to hereafter, collectively, as cables 209 and, generically, as a cable 209), such that a projector 207 may control a respective camera 208 to capture an image, as described in more detail below. However, in other embodiments, the trigger cables 209 are optional and the cameras 208 are triggered via the client device 201 and/or via a local Ethernet.

As depicted, client device 201 comprises a computing device that may control the projectors 207 and the cameras 208 to synchronize respective actions, for example respective actions associated with projecting structured light patterns and capturing images of structured light patterns. The client device 201 may be a device of the alignment system 105 and/or another computing device. As depicted, the client device 201 is in communication with the projectors 207 and the cameras 208 via an ethernet switch 211 and respective wired and/or wireless communication links 213 between the ethernet switch 211 and the projectors 207 and the cameras 208.

In some example embodiments, the client device 201 may control the projectors 207 and the cameras 208 to switch between several modes. Such modes include: controlling a respective projector 207 to determine and project a structured light bitplane as well as altering content bitplanes to subliminally project the structured light bitplane, while also triggering a camera 208 to capture the structured light bitplane; and controlling a respective projector 207 to not determine and project a structured light bitplane as well as not altering content bitplanes to subliminally project the structured light bitplane, while also not triggering a camera 208 to capture the structured light bitplane.

As depicted, the system 200 further comprises a synchronized video source 215, which may comprise one or more of the rendering device 101, the content player 103 and the device 108. For example, the video input 112 may comprise the video from the synchronized video source 215. In particular, the synchronized video source 215 provides video that includes video synchronization (VSync) signals that signal a beginning and/or end of frame of the video. In FIG. 2, the synchronized video source 215 communicates with the projectors 207 via respective communication links 218 that may be separate from the links 213. However, in other embodiments the links 213, 218 may be combined.

Each of the projectors 207 is generally configured to project respective video received from the synchronized video source 215 using bitplanes. For example, each frame of video is divided into a plurality of content bitplanes, each bitplane comprising an array of binary data that is used to control each hardware pixel of an image modulator of each of the projectors 207. Put another way, the video and/or the video input 112 may be divided into a plurality of content bitplanes, for example by a projector 207 receiving the video and/or the video input 112.

For example, the image modulator of each of the projectors 207 may comprise a DMD, with pixels of each bitplane corresponding to hardware pixels of the DMD, in a one-to-one relationship (e.g. excluding a pond of mirrors around the DMD). Indeed, each pixel of each bitplane comprises respective binary data indicating, for example, a "1" or a "0") which indicates whether a mirror of a hardware pixel is to be in an on-state or an off-state. Hence when a bitplane is processed by a projector 207, the respective DMD is instructed to turn each hardware pixel on or off for a given period of time. Hence, each corresponding pixel of a series of bitplane represents a portion of a total brightness of the corresponding projected pixel of a video frame. Furthermore, a number of the plurality of content bitplanes for an image frame may depend on a bit depth of the video frame, with more bitplanes provided as the bit depth increases; in addition, bitplanes associated with higher significant bits are associated with a higher weight (e.g. duration of projection), and bitplanes associated with lower significant bits are associated with a lower weight, relative to the higher weight, as described in more detail below.

As a projector 207 configured to project color images generally includes three light sources, for example for each of red, green and blue light, and the like, color images are generally produced by modulating the red, green and blue light, either in parallel (e.g. assuming three image modulators, or one image modulator for each color of light) or serially (e.g. assuming one image modulator which modulates each color of light in a sequence). As such, for color images (e.g. non-monochrome images), the content bitplanes may comprise content bitplanes for each color of light.

Furthermore, one or more of the projectors 207 may be configured to project structured light patterns as part of a calibration the system 200. The structured light patterns maybe be received at the one or more projectors 207 via the structured light pattern data 199. The structured light patterns may also be divided into bitplanes for projection. Such bitplanes are referred to herein as structured light bitplanes which are similar to content bitplanes, however structured light bitplanes correspond to structured light patterns used to calibrate the system 200, while content bitplanes correspond to video and/or images to be projected onto the surface 217 in a projection mapping "show". In particular, as described hereafter, the video and/or video input 112 to be projected by the projectors 207 are divided into content bitplanes (e.g. content to be projected in a projection mapping "show"), while the structured light bitplanes are subliminally incorporated into the content bitplanes, for example by a projector 207, as part of a calibration process.

Figure 3:
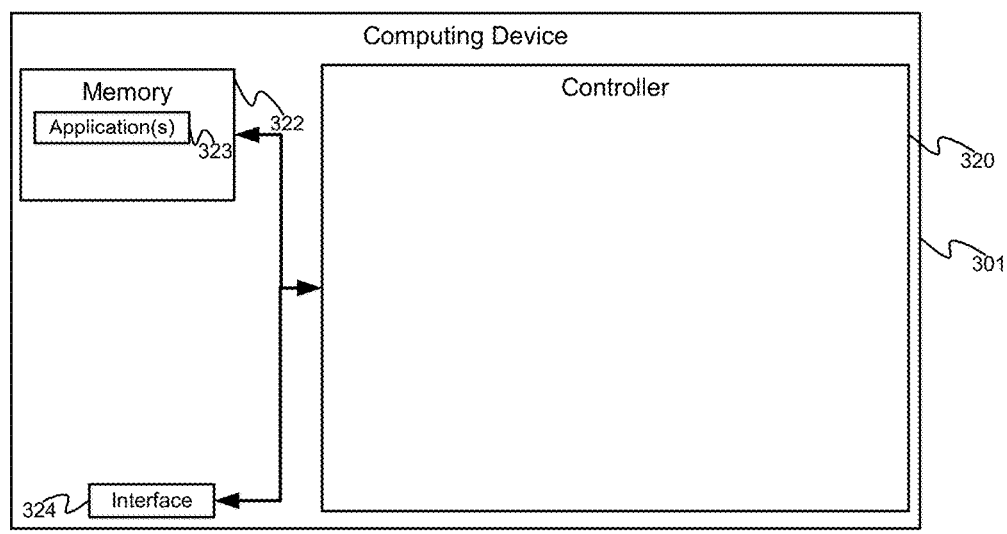
FIG. 3 depicts a block diagram of a computing device for controlling a projector to subliminally project structured light patterns, which can be used in the system of FIG. 1, according to non-limiting embodiments.

Attention is next directed to FIG. 3 which depicts a computing device 301, interchangeably referred to hereafter as the device 301, which may comprise the image modification module 120; hence each of the projectors 207 may comprise a respective device 301. Alternatively, the device 301 may be separate from each of the projectors 207 and may, for example, be component of the synchronized video source 215, and the like. Furthermore, the client device 201 may have a similar structure as the device 301, however adapted for the functionality of the client device 201. For example, as described hereafter, the device 301 is generally configured to alter images for projection by a projector 207, and when the device 301 is adapted for the functionality of the client device 201, the device 301 may be configured to determine poses of projectors 207 and/or to control the projectors 207 and cameras 208 to operate in various modes as described above.

The computing device 301, can comprise any suitable computing device, including but not limited to a graphics processing unit (GPU), a graphics processing device, a graphics processing engine, a video processing device, a personal computer (PC), a server, and the like, and generally comprises a controller 320, a memory 322 storing one or more applications 323, and a communication interface 324 (interchangeably referred to hereafter as the interface 324).

Each of the one or more applications 323 may be similar, but for a different mode of operation of the system 200 and/or the computing device 301 (e.g. a first application 323 may be for controlling an image modulator of a projector 207 to project unaltered video, while a second application 323 may be for controlling an image modulator of a projector 207 to project altered video). For simplicity, the one or more applications 323 will be interchangeably referred to hereafter as the application 323.

While not depicted, the memory 322 may further store intrinsic characteristics and/or extrinsic characteristics of a projector 207, for example at the application 323, and/or separate from the application 323. While also not depicted, the memory 322 may further store a model of the surface 217, which may be obtained using laser-scanning techniques, and/or a computer aided drawing (CAD) model of the surface 217 may be available. Such data may be stored at the device 301 when the device 301 is adapted for the functionality of the client device 201 and/or when the device 201 is configured to determine the poses of the projectors 207; in particular, the intrinsic and/or extrinsic characteristics of the projectors 207 and the model of the surface 217 may be used to determine a pose of a projector 207 by the structured light patterns, with the images of structured light patterns, when projected by the projector 207 and captured by a camera 208.

The controller 320 can comprise a processor and/or a plurality of processors, including but not limited to one or more central processors (CPUs) and/or one or more graphics processing units (GPUs) and/or one or more processing units; either way, the controller 320 comprises a hardware element and/or a hardware processor. Indeed, in some implementations, the controller 320 can comprise an ASIC (application-specific integrated circuit) and/or an FPGA (field-programmable gate array) specifically configured for altering content bitplanes for subliminal projection of structured light patterns. Hence, the device 301 may preferably not be a generic computing device, but a device specifically configured to implement specific functionality for altering content bitplanes for subliminal projection of structured light patterns. For example, the device 301 and/or the controller 320 can specifically comprise a computer executable engine configured to implement specific functionality for altering content bitplanes for subliminal projection of structured light patterns.

The memory 322 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 301 as described herein are typically maintained, persistently, in the memory 322 and used by the controller 320 which makes appropriate utilization of volatile storage during the execution of such programming instructions. Those skilled in the art recognize that the memory 322 is an example of computer readable media that can store programming instructions executable on the controller 320. Furthermore, the memory 322 is also an example of a memory unit and/or memory module and/or a non-volatile memory.

In particular, the memory 322 stores the application 323 that, when processed by the controller 320, enables the controller 320 and/or computing device 301 to: alter at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration.

The interface 324 comprises any suitable wired or wireless communication interface configured to communicate with the projectors 207 and/or the client device 201 and/or the synchronized video source 215, depending on the location and/or functionality of the device 301. The interface 324 may communicate in a wired and/or wireless manner as desired including, but not limited using cables, WiFi communication links, Bluetooth™ communication links, personal area networks, local area networks, and the like.

Figure 4:
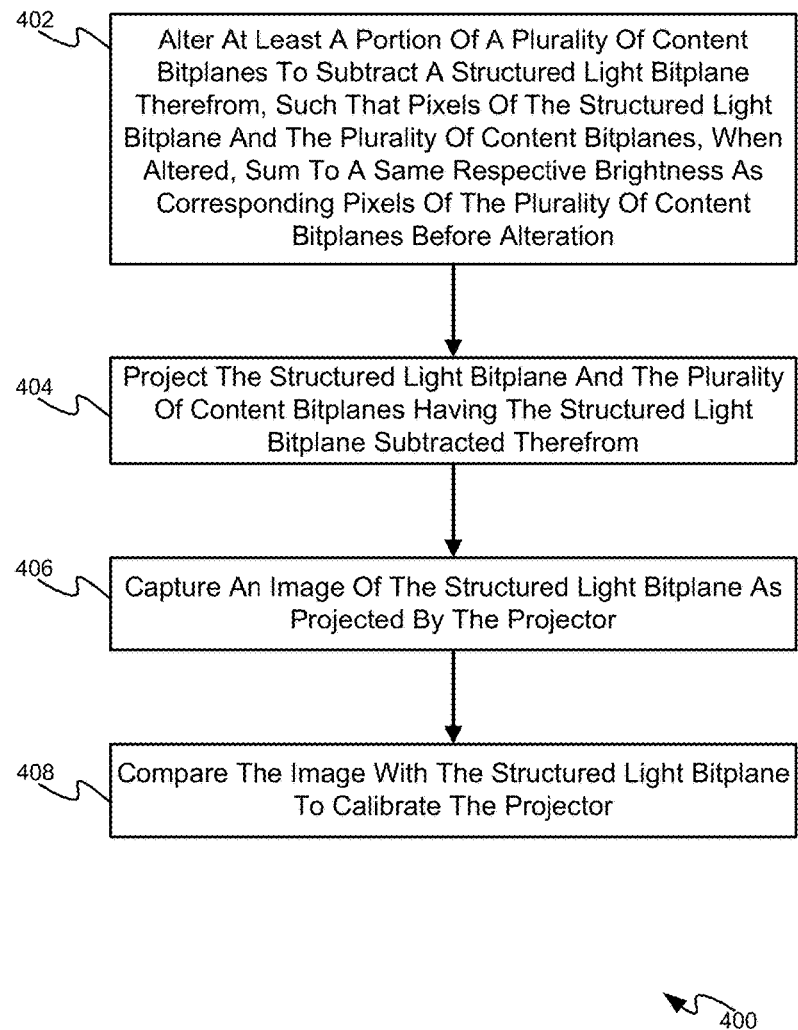
FIG. 4 depicts a method for subliminally projecting structured light patterns, according to non-limiting embodiments.

Attention is now directed to FIG. 4 which depicts a flowchart of a method 400 for subliminally projecting structured light patterns, according to non-limiting embodiments. In order to assist in the explanation of the method 400, it will be assumed that the method 400 is performed using the system 200, and at least partially by the controller 320 of the device 301, for example when the controller 320 processes application 323. Indeed, the method 400 is one way in which the systems 100, 200 and/or the device 301 can be configured. Furthermore, the following discussion of the method 400 will lead to a further understanding of the device 301, and the systems 100, 200 and its various components. However, it is to be understood that the systems 100, 200 and/or the device 301 and/or the method 400 can be varied, and need not work exactly as discussed herein in conjunction with each other, and that such variations are within the scope of present embodiments.

Regardless, it is to be emphasized, that the method 400 need not be performed in the exact sequence as shown, unless otherwise indicated; and likewise, various blocks may be performed in parallel rather than in sequence; hence the elements of the method 400 are referred to herein as "blocks" rather than "steps". It is also to be understood, however, that the method 400 can be implemented on variations of the system 200 as well. Furthermore, while computing device 301 is described as implementing and/or performing at least a portion of the blocks of the method 400, it is appreciated that such blocks of the method 400 occur using the controller 320 processing application 323.

At a block 402, the computing device 301 alters at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration. The block 402 will be described in further detail below with respect to FIG. 5 to FIG. 7.

At a block 404, a projector 207 projects the structured light bitplane and the plurality of content bitplanes having the structured light bitplane subtracted therefrom. The projector 207 performing the block 404 may be the same projector 207 that comprises the computing device 301 that performs the block 402.

At block 406, a camera 208 captures an image of the structured light bitplane as projected by the projector 207.

At a block 408, the client device 201, and/or another computing device of the alignment system 105, compares the image (e.g. captured by the camera 208 at the block 406) with the structured light bitplane (e.g. as projected by the projector 207 at the block 404) to calibrate the projector 207, for example to determine a pose of the projector.

The method 400 may be repeated for a plurality of different structured light bitplanes, and/or for more than one of the projectors 207, for example to determine a plurality of projector-to-camera pixel correspondences and/or projector-to-projector pixel correspondences and/or projector-to-screen pixel correspondences, and the like, to calibrate each of the projectors 207 in the system 200, for example to determine pose data for each of the projectors 207. The pose data for each of the projectors 207 may be provided as pose data 109p to the rendering device 101 and/or the device 108 to update the video input 112. Alternatively, the calibration may further include determining object data 109O of the surface 216, which may be provided as object data 109O to the rendering device 101 and/or the device 108 to update the video input 112 (which may comprise the plurality of content bitplanes). As the structured light bitplanes are projected subliminally with the plurality of content bitplanes, the system 100 and/or the system 200 may be calibrated and/or recalibrated during, and/or without interruption, of a projection mapping show, being provided by the video input 112 and/or the plurality of content bitplanes.

The method 400 is next described with respect to FIG. 5 to FIG. 10.

Figure 5:
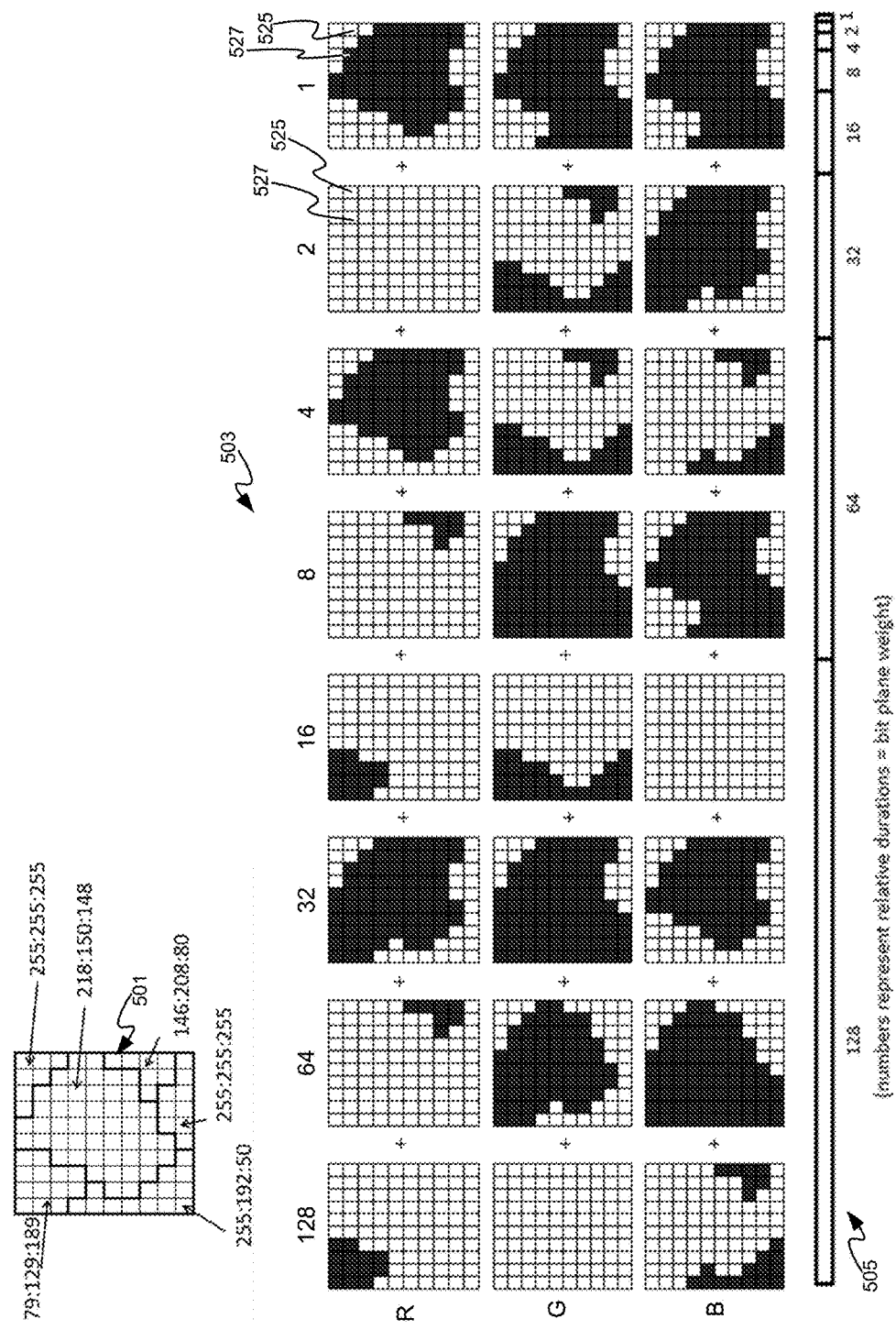
FIG. 5 depicts a plurality of content bitplanes used to project a video frame, according to non-limiting embodiments.

Attention is next directed to FIG. 5 which depicts an example image 501 being divided into a plurality of content bitplanes 503, for example by a projector 207 and/or a computing device 301 thereof. For example, a projector 207 and/or a computing device 301 receiving the image 501 as a video frame may divide the image 501 into the plurality of content bitplanes 503.

The example image comprises a grid of 10×10 image pixels to be projected by a projector 207 in a video frame. The image 501 includes five regions having a respective color as defined by RGB (red:green:blue) coordinates each from a scale of 0 to 255; hence, each pixel has a bit depth of 8 (e.g. $2^8$ is 256). For example, a region on the upper left of the image 501 has RGB coordinates of 79:129:189.

The image 501 is divided into a plurality of content bitplanes 503 for each of the different colors red, green and blue. FIG. 5 hence depicts a row "R" of red content bitplanes 503, a row "G" of green content bitplanes 503 and a row "G" of blue content bitplanes 503.

Indeed, as the bit depth of the image is 8, there are eight bitplanes for each colour and hence, each content bitplane 503 in each row is further depicted in a column, with eight columns.

Each column is associated with a respective weight, with each column from left to right having half the weight of the column to the left. The first column has a weight of 128, the second column has a weight of 64, the third column has a weight of 32, etc., to the last column which has a weight of 1.

The weight generally indicates a respective duration 505 (e.g. a respective length of time) that each content bitplane 503 in a column is projected, relative to the other weights of the other columns. Hence, content bitplanes 503 in the first column are projected for double the time duration as content bitplanes 503 in the second column, etc. For example, a video frame in which the image 501 is projected may be divided into a plurality of time periods, the length of the time periods being dependent on the frame rate of the video, as well as image modulator and/or DMD load times of a projector 207. Indeed, bitplanes may be projected only for a time period that is no longer than an image modulator and/or DMD load time, which may be on the order of about 100 microseconds to about 200 microseconds, however other time periods for bitplanes are within the scope of the present specification. Hence, the content bitplanes 503 are generally distributed among the time periods according to their respective weights.

Images (e.g. sub-images of the image 501) corresponding to the content bitplanes 503 in the first column will be projected for half of the time periods, images (e.g. sub-images of the image 501) corresponding to the content bitplanes 503 in the second column will be projected for a quarter of the time periods, and so on. Indeed, the content bitplanes 503 may be distributed throughout the video frame according to their respective weights, but any given content bitplane 503 (i.e. subimages corresponding thereto) need not be projected in adjacent time slots, for example to prevent a human vision system (e.g. the human eye and/or a computer vision system configured to operate similar to the human eye) from "seeing" one content bitplane 503; rather, the content bitplanes 503 are projected in a manner that enables a human vision system to visually integrate subimages corresponding to the content bitplanes 503 to "see" the image 501.

Two example pixels 525, 527 of the content bitplanes 503 are identified in FIG. 5, specifically with reference to the red content bitplanes having a weight of 2 and a weight of 1. The example pixels 525, 527 will be compared, below, with respect to FIG. 7, to example altered red content bitplanes.

Attention is next directed to FIG. 6 which depicts the image 501 and a structured light pattern 601 which, when subtracted from the image 501, results in an altered image 603. As depicted, the structured light pattern 601 comprises a grid of 10×10 image pixels, similar to the image 501; specifically, the structured light pattern 601 comprises a binary pattern that may be used to calibrate the system 200 and/or a projector 207.

As depicted, the structured light pattern 601 comprises two vertical stripes and two horizontal stripes, of uniform color, and in particular white (e.g. equal parts red, green and blue), with regions outside the stripes being black; however, the structured light pattern 601 may comprise any pattern that may be used to calibrate the system 200 and/or a projector 207.

Pixels of the structured light pattern 601 may further be of a lower brightness than corresponding pixels of the image 501; hence, when the structured light pattern 601 is subtracted from the image 501, the resulting altered image 603 is similar to the image 501, however with regions 605 of stripes corresponding to the stripes of the structured light pattern 601. As depicted, the regions 605 are depicted as a uniform grey, however, each pixel in the regions 605 may be of a different brightness depending on the brightness of each corresponding pixel of the image 501 as compared to the structured light pattern 601.

It is further appreciated that, as depicted, no pixel of the image 501 is black (e.g. an RGB of 0:0:0). However, in other embodiments some pixels of the image 501 that correspond to the stripes and/or non-black regions of the structured light pattern 601 may be black and/or of a brightness lower than the brightness of the stripes of the structured light pattern 601. In general, in such embodiments, the black pixels and/or low brightness pixels of the image 501 may be excluded from the subtraction process.

In general, a projector 207 may project the altered image 603 and the structured light pattern 601 such that, the structured light pattern 601 may be captured by a camera 208 and the sum of the structured light pattern 601 and the altered image 603, for example as integrated by a human vision system, appears as the image 501.

As such, a structured light bitplane corresponding to the structured light pattern 601 is generated and integrated with content bitplanes that sum to the altered image 603.

For example, attention is next directed to FIG. 7 which depicts a plurality of content bitplanes 703 that are similar to the content bitplanes 503, however with at least a portion of the plurality of content bitplanes 503 altered to subtract a structured light bitplane 713 therefrom, such that pixels of the structured light bitplane 713 and the plurality of content bitplanes 703 (e.g. the altered content bitplanes 503), sum to a same respective brightness as corresponding pixels of the plurality of content bitplanes 503 before alteration. Similar to the content bitplanes 503, the content bitplanes 703 are arranged in RGB rows corresponding to color, and in columns of weights ranging from 128 to 1, for a bit depth of 8. Furthermore, while the structured light bitplane 713 is located in FIG. 7 after the altered content bitplanes 703, when the structured light bitplane 713 is projected, as described below, the structured light bitplane 703 may be projected before the content bitplanes 703, after the content light bitplanes 702, or between content bitplanes 703.

As depicted, the structured light bitplane 713 comprises three structured light bitplanes, one structured light bitplane for each RGB color. In other words, the structured light bitplane 713 in row "R" is for red light, the structured light bitplane 713 in row "G" is for green light, and the structured light bitplane 713 in row "B" is for blue light, such that the sum of the structured light bitplane of the three colors sum to the "white" structured light pattern 601.

The structured light bitplane 713 is assigned a weight, relative to the respective weights of the plurality of content bitplanes, where: the structured light bitplane 713, when projected, is not visible to a human vision system; and the structured light bitplane 713, when projected, is captured by a camera 208, according to at least one of a sensitivity and speed of the camera 208. Furthermore, the weight of the structured light pattern 713 is generally compatible with the load times of the image modulator and/or DMD. For example, the structured light bitplane 713 is assigned a weight where the structured light bitplane 713 is projected for a duration of time where the structured light bitplane 713 is not visible to a human vision system, and where a camera 208 may capture the structured light bitplane 713, and that is also image modulator and/or DMD load times. While as depicted, the weight of the structured light pattern 713 is "1", the structured light bitplane 713 may be assigned any weight that meets the conditions, including weights higher than "1" and/or a minimum weight. For example, the weight of the structured light pattern 713 may be "2" or "4", or higher, as long as the weight meets the conditions.

Comparing the content bitplanes 703 with the content bitplanes 503, it is apparent to one of skill in the art that the content bitplanes 503, 703 of weight 128 are the same, but at least a portion of the content bitplanes 703 of weights 64, 32, 16, 8, 4, 2, 1 are altered as compared to the corresponding bitplanes 503. In general, the content bitplanes 503 may be altered in any manner to produce the corresponding bitplanes 703 such that pixels of the structured light bitplane 713 and the plurality of content bitplanes 703 sum to a same respective brightness as corresponding pixels of the plurality of content bitplanes 503.

Such alteration may include, turning off a first subset of pixels of the plurality of content bitplanes 503 (e.g. to generate corresponding content bitplanes 703) that correspond to on-pixels of the structured light bitplane 713.

For example, in FIG. 7, a pixel 725 is indicated in the red content bitplane 703 (row "R") having a weight of 1. The pixel 725 corresponds to a pixel 726 in the stripes of the structured light bitplane 713. It is apparent that the pixel 725 is off as compared to the corresponding pixel 525 of the content bitplane 503 having a weight of "1". The pixels of the other red content bitplanes 703 corresponding to the pixel 725 are all similar to the corresponding pixels the content bitplanes 503. Hence, in these embodiments, the red content bitplane 503 of a weight of "1" is altered to subtract a pixel of the same weight as the corresponding pixel 726 in the stripes of the structured light bitplane 713.

However, in FIG. 7, pixels 727 are indicated in the red content bitplanes 703 (row "R") having a weight of "1" and a weight of "2". The pixel 727 also corresponds to a pixel 728 in the stripes of the structured light bitplane 713. However, it is apparent that the pixel 727 is on as compared to the corresponding pixel 527 of the content bitplane 503 having a weight of "1", and off as compared to the corresponding pixel of the content bitplane 503 having a weight of "2". The sum, however, of the pixel 727 for each of the red content bitplanes 703 of "1" and "2" is the equivalent of a subtraction of the corresponding pixel in the stripes of the structured light bitplane 713. The pixels of the other red content bitplanes 703 corresponding to the pixel 727 are all similar to the corresponding pixels of the content bitplanes 503. Hence, in these embodiments, the red content bitplane 503 of a weight of "1" is altered to add (and/or turn on) a pixel of the same weight as the corresponding pixel in the stripes of the structured light bitplane 713, and the red content bitplane 503 of a weight of "2" is altered to subtract (and/or turn off) a pixel of double the weight as the corresponding pixel in the stripes of the structured light bitplane 713. This operation is the equivalent of subtracting a pixel from the red content bitplane 503 having a weight of "1", and leaving the remaining corresponding pixels in the other red content bitplanes 503 unaltered; however, such addition and subtraction may occur in any manner which may be determined to reduce the likelihood of a human visual system "seeing" differences between the content bitplanes 503, 703.

For example, the structured light pattern 601 may be used to generate the structured light bitplane 713, which is subtracted from the total light and/or sum of the content bitplanes 503; however, a complementary structured light bitplane (e.g. being the inverse of the structured light bitplane 713, with "on" pixels of the structured light bitplane 713 being "off" pixels of the complementary structured light bitplane, and vice versa) may be generated, and combined with the content bitplanes 503 such that pixels of the structured light bitplane 713 and the plurality of content bitplanes, when altered (e.g. including combining the content bitplanes 503 with the complementary structured light bitplane), sum to a same respective brightness as corresponding pixels of the plurality of content bitplanes before alteration. Such a scheme was found to reduce processing resources when altering at least a portion of the content bitplanes 503 to subtract the structured light bitplane 713 therefrom.

Furthermore, while the subtracting the structured light bitplanes from the content bitplanes has been described with respect to the red content bitplanes, it is apparent to a person of skill in the art, for example by comparing FIG. 5 and FIG. 7, that the plurality of content bitplanes 503 comprises bitplanes of different colors (e.g. red, green and blue), and at least the portion of the plurality of content bitplanes 503 are altered to subtract the structured light bitplane therefrom by subtracting the structured light bitplane 713 from each of the bitplanes of the different colors.

In general, when a projector 207 projects a structured light bitplane, the other projectors 207 (e.g. that may have overlapping fields of view with the projector 207 projecting the structures light bitplane) are controlled to not project a structured light bitplane; rather, in the same time period, the other projectors 207 may project a placeholder bitplane, such as an all black bitplane. Furthermore, at least one of the camera 208, having an overlapping field of view with the projector 207 projecting the structures light bitplane, is controlled to capture the structured light bitplane as projected.

Such synchronization of the projectors 207 and the cameras 208 may occur in any suitable manner, including, but not limited to, adapting the system 200 with cabling to implement the synchronization.

However, in other embodiments, respective actions of the plurality of projectors 207 and a camera 208 used to capture a structured light bitplane may be synchronized using communications synchronized to video synchronization signals.

For example, attention is next directed to FIG. 8 which depicts the system 200 with video being projected by each of the projectors 207, as received from the synchronized video source 215. In particular, each projector 207 is projecting a respective series of video frames; as depicted, the projector 207-1 is projecting a series of video frames 807-1, the projector 207-2 is projecting a series of video frames 807-2, and the projector 207-3 is projecting a series video frames 807-3. The series of video frames 807-1, 807-2, 807-3 are interchangeably referred to hereafter, collectively, as a series of video frames 807; however, an individual video frame in each series will be referred to, hereafter, as a video frame 807. Furthermore, the video frames 807 may be from the same video source, such as synchronized video source 215, or from different video sources (e.g. the system 200 may comprise more than one synchronized video source).

Furthermore, each series of video frames 807 each include video synchronization (VSync) signals 811, which indicate the beginning of a video frame 807. A person of skill in the art understands that each line in a timeline 813 for each of the video frames 807 at each transition between adjacent video frames 807 is indicative of a VSync signal 811. Hence, the video frames 807 may be referred to as synchronized and/or frame locked (e.g. regardless of the source of the video frames 807).

Also depicted in the timeline 813 under each of the video frames 807 are time periods 815 during which structured light bitplanes may be projected. As depicted, there is one time period 815 per video frame 813 and/or one time period 815 between adjacent pairs of VSync signals 811. The time period 815 corresponds to the weight of the structured light bitplane 713 of FIG. 7. However, a person of skill in the art understands that when a projector 207 is not projecting a structured light bitplane, a placeholder bitplane may be projected in a time period 813; for example, when no structured light bitplane is projected, a black placeholder bitplane may be projected in place of the structured light bitplane for example to obviate interfering with structured light bitplanes projected by other projectors 207.

Attention is next directed to FIG. 9 and FIG. 10, each of which are substantially similar to FIG. 8, with like elements having like numbers. FIG. 9 and FIG. 10 depict an example embodiment for using communications synchronized to video synchronization signals to control the projectors 207 and the cameras 208 to perform respective actions to project, and capture an image of, a structure light bitplane, for example while the system 200 is implementing the method 400.

In particular, a person of skill in the art understands that each of the projectors 207 does not project a structured light bitplane until controlled to do so by the client device 201; however, as depicted in FIG. 9 and FIG. 10, such control may occur by way of the client device 201 first configuring the system 200 to prepare for projecting, and capturing an image of, a structured light bitplane; and then using one of the projectors 207 to trigger the projection and capturing of the structured light bitplane.

For example, as depicted in FIG. 9, one of the projectors 207 may comprise a master projector, such as the projector 207-1, configured to cause one of the projectors 207 to project a structured light bitplane and further cause one of the projectors 207 to trigger a camera 208 connected thereto, using a respective cable 209, to capture an image of the structured light bitplane. The projector 207 projecting the structured light bitplane may be the same or different as the projector 207 triggering a camera 208 connected thereto to capture the image of the structured light bitplane.

The client device 201 may transmit (e.g. via the switch 211) a command 901 to the master projector 207-1 to prepare to signal the projectors 207 to perform a respective action (e.g. in a frame 807 labelled "1" in FIG. 9). Similarly, assuming that the projector 207-2 is to project the structured light bitplane and the camera 208-3 is to capture an image of the structured light bitplane projected by the projector 207-2, the client device 201 also transmits a command 902 to the projector 207-2 to prepare to project the structured light bitplane, and a transmits a command 903 to the projector 207-3 to prepare to trigger the camera 208-3 to capture the structured light bitplane.

The master projector 207-1 may then, after a video synchronization signal 811, control all of the plurality of projectors 207 and the cameras 208 to perform a respective action within a same video frame, including the projector 207 projecting the structured light bitplane and the camera 208 capturing the structured light bitplane. The respective action may occur after a next VSync signal 811.

For example, as depicted in FIG. 10, the master projector 207-1, after a video synchronization signal 811 (e.g. in a frame 807 labelled "2" in FIG. 10, that follows frame "1"), broadcasts a "GO" command 1001, and the like, to all of the other projectors 207 (e.g. the projectors 207-2, 207-3), via the switch 211, to perform the respective action received previously in the commands 902, 903. In general, the respective actions of the plurality of projectors 207 and the camera 208 capturing the structured light bitplane are synchronized using one or more of Ethernet networking commands, a User Datagram Protocol (UDP) broadcast, a Transmission Control Protocol (TCP) broadcast, a Reliable DataGram Protocol (RDP) broadcast, a Reliable User DataGram Protocol (RUDP) broadcast and the like. As such, the command 1001 may be broadcast using one or more of Ethernet networking commands, a UDP broadcast, a TCP broadcast, a RDP broadcast, a RUDP broadcast, and the like. However, any suitable type of broadcast for transmitting the command 1001 is within the scope of the present specification.

In any event, when the projector 207-2 receives the command 1001, the projector 207-2 (or more generally a computing device 301) implements the block 402 of the method 400 (e.g. incorporating the structured light bitplane 713 into the content bitplanes 503; in these embodiments, the projector 207-2 further generates the content bitplanes 503). After a next VSync signal 811 (e.g. in a frame 807 labelled "3" in FIG. 10, that follows and/or is next to frame "2"), the projector 207-2 projects (e.g. at the block 404 of the method 400) the structured light bitplane in the next time period 815 (as well as the altered content bitplanes, as described with reference to FIG. 7, within the frame 807 labelled "3", at times before or after the time period 815), as indicated by a time period 815 of the video frames 807-2 being blacked out, and also indicated by the box labelled "SSL" for Subliminal Structured Light adjacent the projector 207-2.

The other projectors 207 do not project a structured light bitplane in the same time period 815 corresponding to the time period 815 where the structured light pattern is projected, as indicated by the boxes labelled "NO SSL" for No Subliminal Structured Light adjacent the projectors 207-1, 207-3.

Similarly, the projector 207-3 also receives the command 1001, and after the same next VSync signal 811 as where the projector 207-2 projects the structured light pattern, the projector 207-3 triggers 1023 the camera 208-3, via the cable 209-3, to capture (e.g. at the block 406 of the method 400) the structured light pattern in the same time period 815 where the structured light pattern is projected. In other words, the projectors 207-2, 207-3 have their respective actions coordinated via the command 1001 and according to the VSync signals 811.

While not depicted, a person of skill in the art will understand that the client device 201 (and/or another computing device of the alignment system 105) may thereafter receive an image 1050 of the structured light bitplane captured by the camera 208-3. The client device 201, and the like, compares (e.g. at the block 408 of the method 400) to determine projector-camera pixel correspondences between the projector 207-2 and the camera 208-3 and/or projector-to-screen correspondences between the projector 207-2 and the surface 218, for example to determine a pose of the projector 207-2, as part of a calibration process, which may then be provided to the rendering device 101 and/or the device 108 to update the video input 112.

Furthermore, the process depicted in FIG. 9 and FIG. 10 may be repeated for various pairs of projectors 207 and cameras 208 to determine poses for all the projectors 207.

In addition, while the process depicted in FIG. 9 and FIG. 10 has been described with respect to three projectors 207 and three cameras 208, the process depicted in FIG. 9 and FIG. 10 may be performed for one projector 207 and one camera 208 connected to the projector 207 via a respective cable 209. In these embodiments, the one projector 207 may synchronize the camera 208 via the cable 209 without using a broadcast command.

While the process depicted in FIG. 9 and FIG. 10 has been described with respect to using specific Ethernet networking command protocols, other types of protocols may be used to synchronize respective actions of the projectors 207 and the cameras 208 including, but not limited to, Precision Time Protocol (PTP) and the like.

Described herein is a device, system and method for subliminally projecting structure light patterns by altering at least a portion of a plurality of content bitplanes to subtract a structured light bitplane therefrom, and projecting the altered content bitplanes and the structured light bitplane. The light subtracted from the plurality of content bitplanes is moved to the structured light bitplane such that a human vision system viewing the projected structured light bitplane and the altered content bitplanes integrates them to view an image that is the same as that provided by the plurality of content bitplanes before alteration. Hence, the calibration of projectors may be performed during a projection mapping show, without interrupting the show. In some embodiments where a plurality of projectors and at least one camera are used to projection map, calibration of the plurality of projectors using structured light bitplanes may be synchronized using Ethernet networking commands such as a UDP broadcast.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1%", and in yet further embodiments "within 0.5%".

Persons skilled in the art will appreciate that in some embodiments, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other embodiments, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative embodiments and modifications possible, and that the above examples are only illustrations of one or more embodiments. The scope, therefore, is only to be limited by the claims appended hereto.

What is claimed is:

1. A system comprising:
   a computing device configured to: alter at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration;
   a projector configured to project the structured light bitplane and the plurality of content bitplanes having the structured light bitplane subtracted therefrom; and,
   a camera configured to capture images of the structured light bitplane as projected by the projector.

2. The system of claim 1, wherein the computing device is integrated with the projector.

3. The system of claim 1, wherein the structured light bitplane has a weight, relative to respective weights of the plurality of content bitplanes, where:

the structured light bitplane, when projected, is not visible to a human vision system; and
   the structured light bitplane, when projected, is captured by the camera, according to at least one of a sensitivity and speed of the camera.

4. The system of claim 1, wherein at least the portion of the plurality of content bitplanes are altered to subtract the structured light bitplane therefrom by:
   turning off a first subset of pixels of the plurality of content bitplanes that correspond to on-pixels of the structured light bitplane.

5. The system of claim 4, wherein at least the portion of the plurality of content bitplanes are further altered to subtract the structured light bitplane therefrom by:
   turning on a second subset of pixels of the plurality of content bitplanes that correspond to the on-pixels of the structured light bitplane such that a sum of the first subset of pixels and the second subset of pixels is equivalent to a subtraction of the on-pixels of the structured light bitplane from the corresponding pixels of the plurality of content bitplanes.

6. The system of claim 1, wherein the plurality of content bitplanes comprises bitplanes of different colors, and wherein at least the portion of the plurality of content bitplanes are altered to subtract the structured light bitplane therefrom by subtracting the structured light bitplane from each of the bitplanes of the different colors.

7. The system of claim 1, further comprising:
   a plurality of projectors, including the projector, wherein respective actions of the plurality of projectors and the camera are synchronized using communications synchronized to video synchronization signals.

8. The system of claim 7, wherein one of the plurality of projectors comprises a master projector configured to:
   after a video synchronization signal, control all of the plurality of projectors and the camera to perform a respective action within a same video frame, including the projector projecting the structured light bitplane and the camera capturing the structured light bitplane.

9. The system of claim 7, wherein the camera is triggered to capture the structured light bitplane by one of the plurality of projectors.

10. The system of claim 7, wherein the respective actions of the plurality of projectors and the camera are synchronized using one or more of Ethernet networking commands, of a User Datagram Protocol (UDP) broadcast, a Transmission Control Protocol (TCP) broadcast, a Reliable DataGram Protocol (RDP) broadcast, and a Reliable User DataGram Protocol (RUDP) broadcast.

11. A method comprising:
    altering, at a computing device, at least a portion of a plurality of content bitplanes to subtract a structured light bitplane therefrom, such that pixels of the structured light bitplane and the plurality of content bitplanes, when altered, sum to a same respective brightness as corresponding pixels of the plurality of content bitplanes before alteration;
    projecting, using a projector, the structured light bitplane and the plurality of content bitplanes having the structured light bitplane subtracted therefrom; and,
    capturing, using a camera, images of the structured light bitplane as projected by the projector.

12. The method of claim 11, wherein the computing device is integrated with the projector.

13. The method of claim 11, wherein the structured light bitplane has a weight, relative to respective weights of the plurality of content bitplanes, where:

the structured light bitplane, when projected, is not visible to a human vision system; and the structured light bitplane, when projected, is captured by the camera, according to at least one of a sensitivity and speed of the camera.

14. The method of claim 11, wherein at least the portion of the plurality of content bitplanes are altered to subtract the structured light bitplane therefrom by:

turning off a first subset of pixels of the plurality of content bitplanes that correspond to on-pixels of the structured light bitplane.

15. The method of claim 14, wherein at least the portion of the plurality of content bitplanes are further altered to subtract the structured light bitplane therefrom by:

turning on a second subset of pixels of the plurality of content bitplanes that correspond to the on-pixels of the structured light bitplane such that a sum of the first subset of pixels and the second subset of pixels is equivalent to a subtraction of the on-pixels of the structured light bitplane from the corresponding pixels of the plurality of content bitplanes.

16. The method of claim 11, wherein the plurality of content bitplanes comprises bitplanes of different colors, and wherein at least the portion of the plurality of content bitplanes are altered to subtract the structured light bitplane therefrom by subtracting the structured light bitplane from each of the bitplanes of the different colors.

17. The method of claim 11, wherein respective actions of a plurality of projectors, including the projector, and the camera are synchronized using communications synchronized to video synchronization signals.

18. The method of claim 17, wherein one of the plurality of projectors comprises a master projector, and the method further comprises:

after a video synchronization signal, controlling, at the master projector, all of the plurality of projectors and the camera to perform a respective action within a same video frame, including the projector projecting the structured light bitplane and the camera capturing the structured light bitplane.

19. The method of claim 17, wherein the camera is triggered to capture the structured light bitplane by one of the plurality of projectors.

20. The method of claim 17, wherein the respective actions of the plurality of projectors and the camera are synchronized using one or more of Ethernet networking commands, of a User Datagram Protocol (UDP) broadcast, a Transmission Control Protocol (TCP) broadcast, a Reliable DataGram Protocol (RDP) broadcast, and a Reliable User DataGram Protocol (RUDP) broadcast.

* * * * *